US005299716A

United States Patent [19]

Hawkins et al.

[11] Patent Number: 5,299,716

[45] Date of Patent: Apr. 5, 1994

[54] ICE DISPENSER WITH AN ICE FLOW REGULATOR

[75] Inventors: John T. Hawkins; Weldon E. Griffin, both of San Antonio, Tex.

[73] Assignee: Lancer Corporation, San Antonio, Tex.

[21] Appl. No.: 963,423

[22] Filed: Oct. 19, 1992

[51] Int. Cl.[5] F25C 1/00; G01F 11/28

[52] U.S. Cl. 222/146.6; 222/239; 222/241; 222/368

[58] Field of Search 222/129.1, 146.6, 227, 222/239, 241, 242, 370, 410, 641, 643, 368; 62/137, 233, 344

[56] References Cited

U.S. PATENT DOCUMENTS 3,455,490 7/1969 Jolley 222/368
3,881,642 5/1975 Hoenisch 222/370
4,619,380 10/1986 Brooks 222/146.6
5,054,654 10/1991 Schroeder et al. 222/146.6
5,104,007 4/1992 Utter 222/146.6
5,114,053 5/1992 Beirle 222/368

*Primary Examiner*—Andres Kashnikow
*Assistant Examiner*—Philippe Derakshani
*Attorney, Agent, or Firm*—Donald R. Comuzzi

[57] ABSTRACT

An apparatus for dispensing both ice and chilled beverages, and more particularly an improved chilled beverage dispenser which has larger ice storage capacity and which incorporates an improved system of dispensing ice. The improved ice storage and dispensing system utilizes a circular rotating tray and a paddle wheel positioned in an intermediate cone chute to dispense ice efficiently and in a regulated flow in combination with chilled beverages.

13 Claims, 3 Drawing Sheets

ICE DISPENSER WITH AN ICE FLOW REGULATOR

BACKGROUND OF THE INVENTION

The present invention relates to an apparatus for dispensing both ice and chilled beverages, and more particularly, but not by way of limitation, to an improved chilled beverage dispenser which has large ice storage capacity and which incorporates an improved system of dispensing ice.

Available space is a valuable commodity in small convenience stores, cafeterias, concession stands, fast food service lines and the like. The relevant industry sets certain size and dimensional requirements based on practical limitations of service counter size and the ease of everyday operation and routine maintenance. The industry is constantly looking for improved apparatus which take up less counter space while delivering the same or increased levels of efficiency. Small, compact machines, facilitatinq the delivery of good service and suitable for service counters of set and limited dimensions, are constantly in demand. One such demand has been for a combination ice and beverage dispenser. Ice in chilled beverages has become a necessary part of modern-day food service, and a combined ice and chilled beverage dispenser, logically, increases efficiency in food service delivery by eliminating the need for two separate machines and by making more counter space available.

U.S. Pat. No. 4,641,763, issued on Feb. 10, 1987 to Landers, et al., discloses one such effort in which an ice storage bin can provide ice for beverages, while at the same time providing a cooling source for a cold plate which, in turn, chills beverage lines. That disclosure is typical of the state of art prior to the present invention. The apparatus disclosed by Landers is limited in the capacity of stored ice (partially about 90 lbs.) because the bottom level of ice in the storage bin has to be above the height level of the discharge chute for the force of gravity to allow discharge of ice into cups waiting below. Thus, the free space from the lowest portion of the machine to the height level of the bottom layer of ice is wasted and unusable for ice storage.

U.S. Pat. No. 4,679,715, issued on Jul. 14, 1987 to Hovinga, discloses a rotary paddle wheel which is used in a combination ice cube and cold beverage dispenser to elevate ice from lower regions of a storage cabinet up to a dispensing chute. Ice is elevated to roughly the same level as that of the dispensing chute, and the entire storage cabinet, along with all of its internal components, is designed at a tilted angle to allow gravity-assisted dispensing. Because of this sloped design, the paddle wheel is limited to a relatively small size. The size of the wheel is further restricted by a separate enclosure that is a part of the wall of the ice cabinet which is required for the wheel to be able to carry ice within the enclosure's confinement.

The entire design restricts the amount of ice that can be stored within the cabinet which is limited by the height and width demands of the food service industry. The volume of ice in the cabinet is further restricted by addition of a curved false bottom which is designed to create a separate compartment for ice to cool a cold plate. Furthermore, the small size to which the paddle wheel is confined results in inefficient ice delivery as it is restricted to the small amounts of ice that reach it through the tilt angle and narrow channels formed in the opening to its separate enclosure.

A trade publication distributed by SerVend International, Inc., Form No. 2170, copyright 1988, discloses an ice dispenser that also utilizes a paddle wheel. Like the Hovinga patent, the internal ice bin and the paddle wheel system design disclosed in the SerVend brochure is tilted at an angle with wasted dead space below the slanted bottom of the ice storage bin. The SerVend ice dispenser could be combined with a beverage dispenser; however, this would create problems very similar to the restricted volumes found in the storage cabinet of the Hovinga patent.

Another drawback of the SerVend paddle wheel is the delivery of ice up to the apex of the paddle wheel for discharge down a dispensing chute. If this method of dispensing ice is to be incorporated with a beverage dispenser, the industry would demand that the length of drop from the apex of the paddle wheel to beverage containers waiting below be enclosed within a relatively long discharge chute. That will result in wasted ice as conventional beverage holders cannot hold the volume of ice discharged by this excessively long discharge chute.

U.S. Pat. No. 5,054,654, issued on Oct. 8, 1991 to Schroeder, et al., discloses an apparatus which allows for almost double the capacity of ice storage (around 160 lbs.), as compared to machines presently available, by incorporating a rotating tray which lifts ice stored below the height of the discharge chute to an elevation above the chute and then into a secondary cone chute for gravity-assisted dispensing. That design allows the rotating tray to reach throughout the entire height of the ice storage bin with utilization of the entire volume of the bin while still dispensing proper volumes of ice at appropriate height levels.

Although U.S. Pat. No. 5,054,654 improves substantially over the other prior art, it does suffer a design disadvantage. The secondary cone chute, used in conjunction with a set of breaker bars, does not dispense the ice in a consistent and regulated flow. That is, during the dispensing of ice, the ice exits the discharqe chute in large irregular clumps followed by periods of little or no discharge. Such an uncontrolled and excessive dumping wastes ice and creates a situation where constant attention to the level of the ice in the ice bin is required. The secondary cone chute, therefore, merely acts as a conduit which channels the ice to the discharge chute and provides no regulation of ice flow from the ice chute. Furthermore, the breaker bars function only to keep the ice from fusing and push it from the secondary cone chute into the discharge chute and, thus also, supply no regulation of the ice flow form the discharge chute.

It is, therefore, an object of the present invention to provide a combination chilled beverage and ice dispenser with a secondary cone chute equipped with a paddle wheel which operates as an ice flow regulator to dispense ice delivered from an ice bin in a consistent, constant and controlled flow.

It is another object of the present invention to provide a combination chilled beverage and ice dispenser with an enlarged ice storage bin. To that end, the system disclosed herein incorporates a rotating tray which allows for storage of ice below the height level of the discharge chute, permitting the use of the free space below the level of the discharge chute which would otherwise be wasted.

It is a further object of the present invention to provide a combination beverage and ice dispenser which efficiently discharges ice in quantities corresponding to volumes of conventional beverage holders through the use of a cone chute furnished with a regulator located at an intermediate height along the dispenser. The rotating tray of the present invention has the ability to reach the lowest portions of its storage bin, utilizing all available storage space in the storage bin, and can discharge ice at an elevation that meets the demands of the industry without waste caused by excessive discharge.

It is still another object of the present invention to provide a combination beverage and ice dispenser with a rotating tray, a regulator, and a plurality of agitators, all mounted on a single, motor driven shaft such that all separate components mounted on the shaft and agitators can be timed for set periods at set time intervals, using control circuits located on printed circuit boards, in order to prevent the ice from bridging if it is stored for long periods.

It is still a further object of the present invention to provide an a combination beverage and ice dispenser wherein the internal components of the ice-dispensing apparatus are strippable without tools for cleaning and maintenance, thereby, improving sanitation control.

It is an even further object of the present invention to provide a combination beverage and ice dispenser with insulation for chilled beverage lines beyond an ice-cooled cold plate utilizing foamed-in-place insulation.

Still other objects, features, improvements, and advantages of the present invention will become evident to those skilled in the art in light of the following.

SUMMARY OF THE INVENTION

The apparatus of the present invention is basically a combination chilled beverage and ice dispenser integrated with a storage bin of ice. The storage bin is covered at an uppermost portion with a removable lid. The preferred embodiment is designed to allow an operator to remove the lid and fill the bin with ice made in a independent ice-making source at a different location. The removable lid can be replaced with an adaptor which allows for the mounting of an ice maker directly onto the uppermost portion of the ice storage bin. However, the invention allows for large ice storage capacity and the preferred embodiment is designed for use by the majority of the industry which uses ice makers that are separate and independent from the beverage dispenser.

Once ice has been filled in the storage bin, the lid is replaced on the top of the apparatus, which deactivates an interlock switch mechanism and reactivates an electric circuit, thus, allowing safe, injury-free operation of the internal components of the machine. The dispensing of ice begins with activation of a tough-sensitive micro-voltage membrane switch which signals a printed circuit board ("P.C. board"). Pre-programmed logic on the P.C. board activates an electric motor while simultaneously prompting a solenoid to lift a trap door located within an external ice discharge chute. Lifting of the trap door permits the discharge of ice down the discharge chute into beverage holders placed below.

The simultaneous activation of the electric motor begins the rotation of an internal shaft connected to the motor. The internal shaft is mounted with a circular rotating tray, a paddle wheel which operates as a regulator, and a plurality of agitators. Rotation of the shaft rotates the plurality of agitators which breaks up the stored ice in the bin outside the rotating tray and pushes the ice slowly forward into pockets located inside the rotating tray. The ice-laden pockets of the rotating circular tray carry ice upward in a circular motion, like a ferris wheel, and drop their contents into a stationary cone chute situated in the inner circumference of the circular tray through a cut-out portion located on an upper quadrant of the stationary cone chute. Positioned inside the confines of the stationary cone chute is a rotating paddle wheel mounted on the shaft which operates as an ice flow regulator. The ice dropping from the rotating circular tray falls onto the paddle wheel, and as the paddle wheel rotates past the cut-out portion of the stationary cone chute, the ice becomes trapped in the enclosures formed by the vanes of the paddle wheel, the stationary cone chute, and the insulated front wall of the ice storage bin. As the paddle wheel rotates even further, the ice trapped in the enclosures is sequentially delivered to a wall chute which extends through the insulated front wall of the ice storage bin. That is, as the shaft rotates, each enclosure is filled with a load of ice and sequentially rotates, as the paddle wheel rotates, to deliver its load of ice to the wall chute before rotating back to receive another load of ice. The wall chute connects the enclosures formed by the paddle wheel, stationary cone chute, and the insulated front wall of the ice storage bin to an external discharge chute positioned beyond the insulated front wall of the ice storage bin. The wall chute and the external discharqe chute are separated by a trap door. Once ice reaches the wall chute, gravity allows it to slide through the open trap door and into the discharge chute. When electric contact on the membrane switch is released, the solenoid, through a deactivating signal from the P.C. board, simultaneously closes the trap door and shuts off the electric motor which stops the rotation of the internal shaft. That terminates the dispensing of ice. The addition of the paddle wheel, therefore, provides for consistent, constant, and controlled ice flow because rather than delivering the ice in unregulated loads, the paddle wheel delivers sequential, systematic, and nearly equal loads of ice to the wall chute.

The P.C. board is also pre-programmed to rotate the shaft independently of the trap door. In normal operation, ice is not continuously dispensed over time and the apparatus can remain idle for extended periods. A common problem which occurs with stored ice left unagitated over an extended duration is the formation of fusion bridges between adjacent pieces of ice caused by minute melting of the surface areas of the ice. To prevent that formation of clumped ice, the P.C. board is pre-programmed to turn the shaft, through activation of the electric motor, for one revolution every set time period when the machine remains idle. That activation breaks up any bridging in the ice stored in the ice bin without releasing the trap door.

As mentioned earlier, the rotation of the shaft rotates the plurality of agitators which break up the stored ice in the bin. A problem currently encountered with similar agitators on the market is the fusion of ice to the surface of the stainless steel agitators caused by minute melting on the surface of the stores ice pieces, very similar to the bridging mentioned above. That freezing of clumped ice onto agitators creates a tremendous drag on the motor attempting to turn the ice laden agitators on the internal shaft. The present invention overcomes that problem by coating the shaft and agitators with a poor thermal conducting material which acts to prevent the freezing of ice onto those components.

In addition to poor thermal conduction, the coating material should also be resistant to drag by the ice so that after coating with the material, the surface of the shaft and agitators are "slick" and allows them to slice through the stored ice with reduced resistance. TEFLON is an example of such coating material with these desired properties. Epoxy coating is another example and is more economical in application. These examples are not given by way of limitation, and any material which can be applied as coating with similar properties is encompassed within the spirit of this disclosure.

The circular rotating tray of the preferred embodiment is of a single-piece molded construction which makes its manufacture simple and economical since assembly of separate component parts is not required. The tray has a plurality of wedge-shaped pocket compartments which are individually separated by vanes that rise perpendicularly from a circular base. The cone chute is designed to fit into the centermost portion of the circular base such that the vanes form vertical walls on the rotating tray, the circular base forms the floor for the pockets, and the rim of the cone chute completes a plurality of enclosures in the form of the wedge-shaped pockets. The diameter of the tray is of a sufficient length such that the full height of the ice bin can be reached for ice retrieval, including the lowermost regions of the bin. Furthermore, the tray is at a 90° angle in relation to the floor of the ice bin and avoids a slanted design of the interior of the bin, utilizing all available space within the bin.

The circular base of the rotating tray has a plurality of punched-out edges which form openings. An opening is created for each wedge-shaped pocket compartment which allows for communication between the storage bin and the interior of the pocket compartments. The agitators are designed to push ice forward into these openings at a horizontal angle, which avoids the need for a slanted tilt of the interior storage space and the associated dead spaces that would be created by the inclination.

The relevant food service industry requires service counter apparatus, such as the present invention, to be approximately 36 inches tall for use on conventional counter tops. That allows an operator to dispense chilled beverages out of the machine at a convenient height, which is approximately midway from the bottom to the top of the machine, around 18 inches from the level of the counter. Thus, the discharge chute for ice has to also be located at a similar height level to avoid inefficient and unnecessary lifting and lowering of cups to adjust to different heights between ice and beverage dispensing points.

The majority of currently available combination ice and beverage dispensers have ice storage compartments which bottom out at this midway level because that is the minimum height at which ice can be dispensed using the pull of gravity. By utilizing the rotating tray of the present invention, ice can be stored below the midway level, allowing for a larger capacity of ice storage. The rotating tray lifts ice up from the lower regions below midway level to a height sufficient for dispensing above the midway level.

Conventional ice dispensers available on the market can carry ice upward from below the height level of the discharge chute to a point above it for gravity discharge. However, efforts prior to the present invention elevate ice to excessive heights, creating large drop chutes which cause wasteful pile-ups of ice that overflow from cups too small to handle such a volume. In the present invention, ice is carried to the apex of the rotating tray and deposited down into a separate cone chute located roughly at the midway level. The cone chute and paddle wheel negate the need for an excessively long discharge chute, thus preventing needless waste of ice. The volume of the enclosures formed by the paddle wheel, cone chute, and insulated front wall of the ice bin allows for the delivery of only an optimum amount of ice for dispensing into beverage containers waiting below.

Furthermore, the paddle wheel located within the confines of the cone chute, the rotating tray, and agitators located in the storage bin are all mounted on a single shaft. All these elements, including the shaft itself, are removable and replaceable without tools. All component pieces mounted to the shaft are held together by pins which are easily disengaged manually. The National Sanitation Foundation has released a study which states that an increase in the use of tools in the clean-up and maintenance of dispensing apparatus used by the food service industry increased the likelihood of opportunistic infections that could harm the health of consumers. Thus, the ability to break down the internal workings for cleaning without tools reduces the possibility of the spread of communicable diseases.

The circular rotating tray of the present invention need not be confined to the single-piece molded construction of the preferred embodiment. Another embodiment utilizes a two piece construction wherein the first piece is a circular tray of a single-piece molded construction which is mounted onto the interior of the front wall of the dispenser such that a circular flange portion extends from the first piece into the interior of the ice storage bin. The second piece is also of single-piece molded construction which has a plurality of vanes rising perpendicularly from a circular base portion forming a plurality of paddles at ninety-degree angles with said base portion.

As in the preferred embodiment, the cone chute is designed to fit into the centermost portion of the circular base of the second piece such that when the second piece is mounted onto the first piece an enclosure is formed therebetween with a plurality of wedge-shaped pockets disposed within this enclosure. The wedge-shaped pockets are formed by the plurality of paddles of the second piece forming vertical walls separating the pockets, the circular tray of the first piece forming the floor, the circular base portion of the second piece forming the roof, and the flange extending from the first piece and rim of the cone chute completing the outer circular walk.

The diameter of the tray of the second embodiment is also of sufficient length such that the full height of the ice storage bin can be reached for ice retrieval, including the lowermost portions of the bin. Like the preferred embodiment, the tray of the second embodiment is at a 90-degree angle in relation to the floor of the storage bin when mounted onto the interior front wall of the bin, which avoids a slanted design and enables the utilization of all available space within the bin. The circular base portion of the second piece of the second embodiment has a plurality of punched-out edges which form openings. An opening is created for each wedge-shaped pocket compartment which allows for communication between the storage bin and the interior of the pocket compartments. The agitators are designed to push ice forward into these openings at a horizontal angle.

The present invention also incorporates a cold plate located at the lowermost portion of the ice storage bin. Beverage syrup and soda lines (collectively "product lines") are formed in situ with aluminum or like-metal blocks which comprise the cold plate. The cold plate, which forms the lowermost portion of the ice storage bin, is cooled by the ice within the storage bin. Thus, the storage bin serves the dual purpose of both cooling the product lines, by extracting heat from the cold plate, and providing ice to be dispensed. Within the storage bin, a layer of ice is allowed to sit undisturbed over the cold plate. The lowermost portion of the rotating tray and the tips of the agitators are designed with tolerances such that a layer of ice remains unagitated immediately over the cold plate.

That layer of ice need not be suitable for discharge since its purpose is to cool the cold plate and chill the product lines. It is actually preferable for the agitators to not disturb that bottom layer since the constant extraction of heat from the cold plate allows for the ready formation of fusion bridges between ice pieces, which makes that bottom layer of ice relatively more difficult to break up than the upper layers.

Once chilled within the cold plate, the product lines extend upward to beverage-dispensing valves located on the outer face of the apparatus. Since the benefits of the cold plate do not extend as far up as the level of the dispensing valves, a volume of beverage which may remain in the product line beyond the cold plate may warm up if the dispenser is not used in high frequency (that is referred to as the problem of warming up the "occasional drink"). To resolve that problem, the present invention also incorporates product lines insulated with foam beyond the cold plate. That allows for the dispensing of chilled "occasional drinks" even if it is left in the product lines beyond the cold plate. The product lines extending beyond the cold plate are "foamed-in-place" within foaming fixtures having suitable chemical mixtures to form foam insulation around the product lines after leaving the chilled metal of the cold plate. That allows for the consistent dispensing of chilled beverages independent of the frequency of discharge from the dispensing valves.

Other objects, features and advantages of the present invention will become evident in light of the following description of the invention.

DETAILED DESCRIPTION OF THE PREFERRED EMBODIMENT

Figure 1:
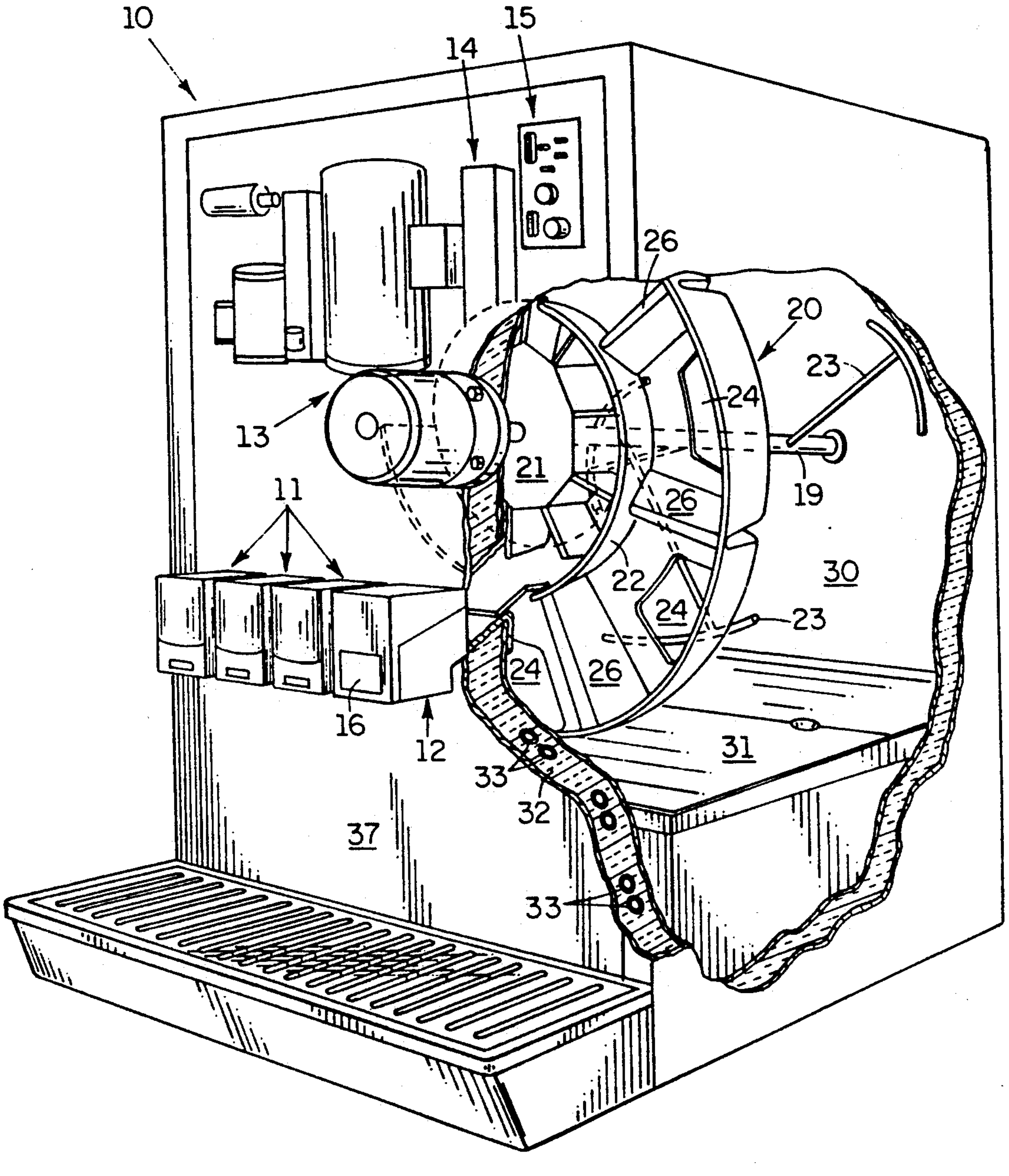
FIG. 1 depicts a perspective view of the combination ice and beverage dispenser of the present invention with a cut-away perspective view into the interior, showing the internal components comprising the preferred embodiment of the ice storage bin.

Referring to FIG. 1, the preferred embodiment of the combination ice and beverage dispenser is generally depicted by numeral 10. On the external face of the dispenser is a plurality of beverage dispenser heads 11, and located adjacent to and at the same height as beverage dispenser heads 11 is external ice discharge chute 12. Above external ice discharge chute 12 is electric motor 13 which is connected by electrical circuitry with solenoid 14 and P.C. board 15. The cut-away portion of FIG. 1 gives a perspective view into the interior of the ice storage bin generally depicted by numeral 30. Inside bin 30 is shown internal shaft 19 with associated components, rotating tray 20, paddle wheel 21, cone chute 22, and a plurality of agitators 23. Forming the floor of ice storage bin 30 is cold plate 31. The walls of storage bin 30 are insulated with foam-in-place generally depicted by numeral 32. Molded in situ in said foam insulation 32 is a plurality of product lines 33, all within the confines of front wall 37.

Referring to the external features of dispenser 10 in FIG. 1, mounted onto external ice discharge chute 12 is membrane switch 16. When an operator desires to dispense ice, a beverage holder is placed below discharge chute 12 and membrane switch 16 is activated by minimal fingertip contact. Activation of switch 16 sends an electric signal to P.C. board 15 which activates solenoid 14 to lift a trap door (shown in FIG. 2 at numeral 17). Simultaneously with activation of solenoid 14, P.C. board 15 also signals motor 13 to rotate shaft 19. Rotation of shaft 19 turns agitators 23 which slowly push stored ice in bin 30 forward into openings 24 connecting the interior of the storage bin with the inside of tray 20.

Figure 2:
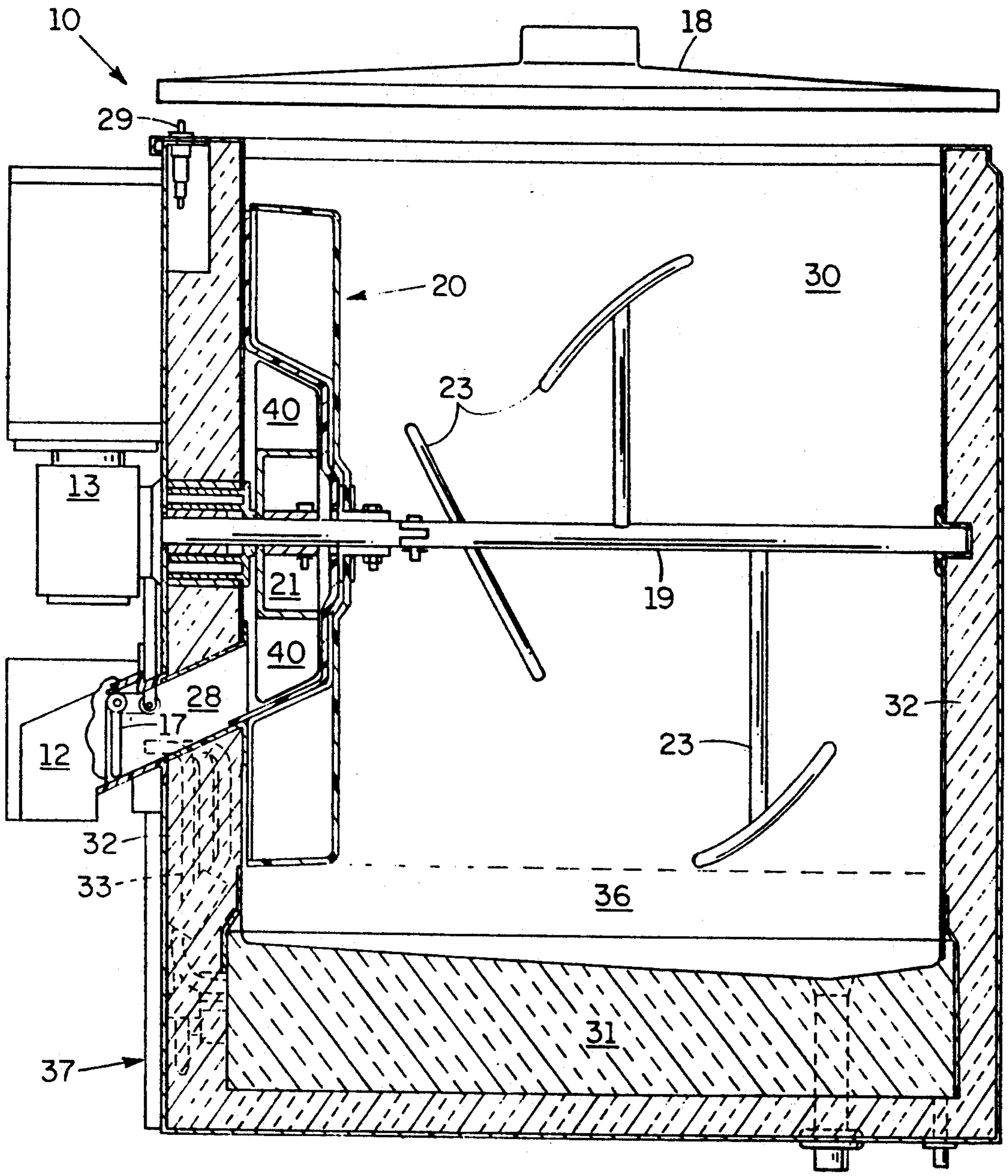
FIG. 2 is a sectional side view displaying the interior of the storage bin and related components that comprise the ice-dispensing system of the preferred embodiment of the present invention.
Figure 3:
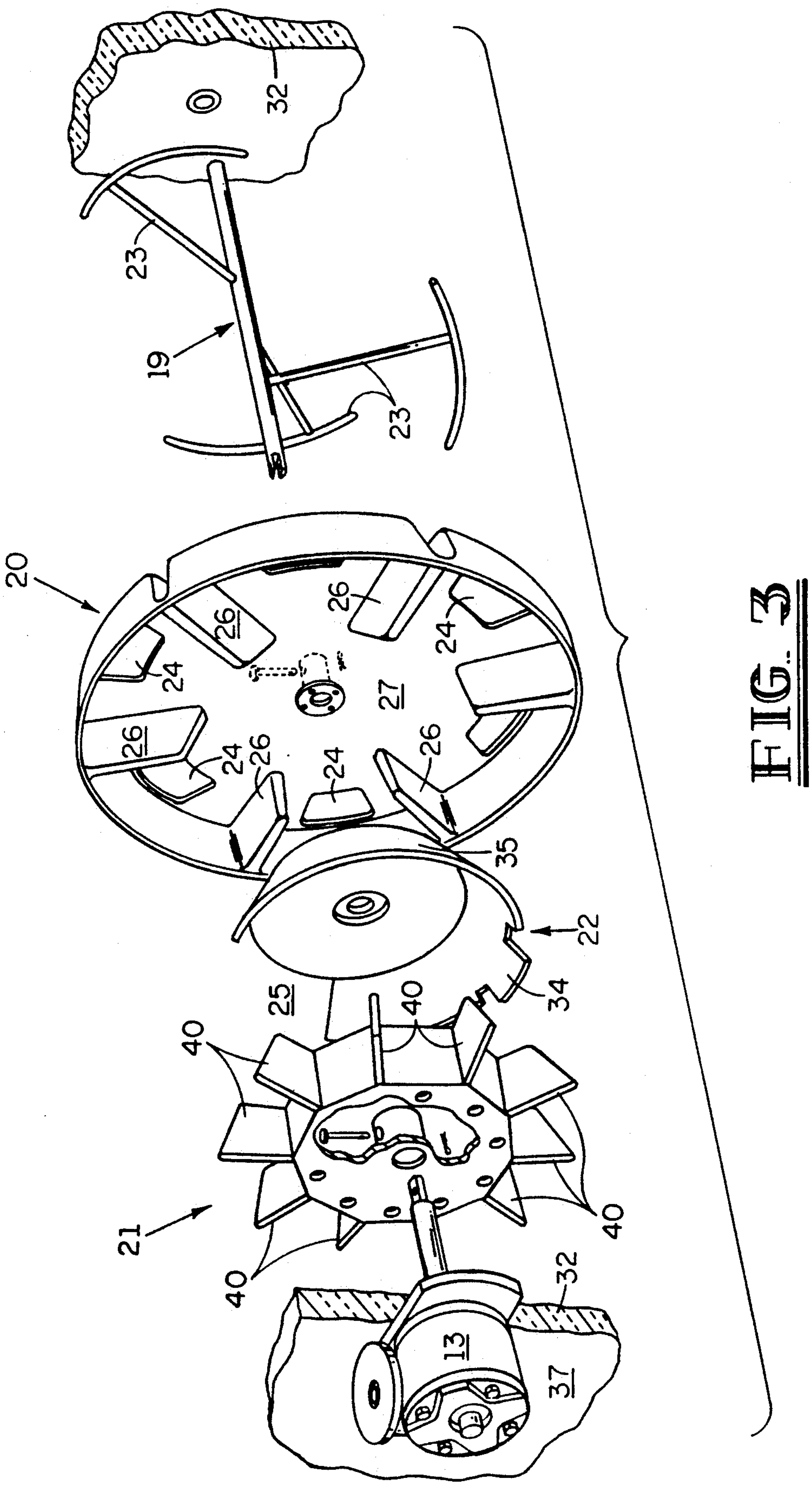
FIG. 3 depicts an exploded view of the internal shaft and related components including an electric motor, a paddle wheel, a cone chute, the preferred embodiment of the rotating tray, and a plurality of agitators, all connected by pins.

Referring to FIG. 2, motor 13 turns shaft 19 which rotates tray 20. That rotation brings ice up from the lower portions of bin 30 toward the apex of rotating tray 20 which is well above the height of external discharge chute 12. Referring to FIG. 3, an exploded perspective view of the associated components of shaft 19 is depicted, showing cone chute 22 with a cut-away segment 25 at an upper quadrant. Rotating tray 20 is shown with a plurality of molded vanes 26 which rise perpendicularly from circular base portion 27. Openings 24 communicate the inside of tray 20 with storage bin 30. Molded vanes 26, circular base portion 27, and rim portion 35 of cone chute 22 form wedge-shaped cavities which carry ice pushed through openings 24 up towards the apex of tray 20. When ice reaches cut-away segment portion 25 of cone chute 22, the force of gravity drops the ice into the confines of cone chute 22.

Referring further to FIGS. 2 and 3, positioned within the confines of cone chute 22 is rotating paddle wheel 21 which is mounted on shaft 19 and operates to regulate the flow of dispensed ice. The ice dropping from rotating tray 20 falls onto paddle wheel 21, and as paddle wheel 21 rotates past cut-out portion 25 of cone chute 22, the ice becomes trapped in the plurality of enclosures formed by the plurality of vanes 40 of paddle wheel 21, cone chute 22, and insulated front wall 37 of ice storage bin 30. As paddle wheel 21 rotates even further, the ice trapped in the enclosures is sequentially delivered to wall chute 28 which extends through insulated front wall 37 of ice storage bin 30. That is, as shaft 19 rotates, each enclosure is filled with a load of ice and sequentially rotates, as paddle wheel 21 rotates, to deliver its load of ice to wall chute 28 before rotating back to receive another load of ice. Wall chute 28 connects the enclosures formed by paddle wheel 21, cone chute 22, and insulated front wall 37 of ice storage bin 30 to ice discharge chute 12 positioned beyond insulated front wall 37 of ice storage bin 30. Wall chute 28 and ice discharge chute 12 are separated by trap door 17. Once ice reaches wall chute 28, gravity allows it to slide down wall chute 28, through open trap door 17, into ice discharge chute 12, and down into a waiting beverage holder. When electric contact on membrane switch 16 is released, solenoid 14, through a deactivating signal from P.C. board 15, simultaneously closes trap door 17 and shuts off electric motor 13 which stops the rotation of shaft 19 and all components inside storage bin 30 mounted onto shaft 19. That terminates the dispensing of ice. The addition of paddle wheel 21, therefore, provides for consistent, constant, and controlled ice flow because rather than delivering the ice in unregulated loads, the paddle wheel delivers sequential, systematic, and nearly equal loads of ice to wall chute 28.

Thus, the present invention is well-suited to carry out the objects and attain the ends and advantages mentioned above as well as those inherent therein. While the preferred embodiment of the present invention has been described for the purposes of disclosure, changes in the design and arranqements of features can be made by those skilled in the art, which changes are encompassed within the spirit of this invention as defined by the appended claims.

I claim:

1. A combination ice and beverage dispenser comprising:

ice storage means;

ice discharge means communicating between the interior and exterior of said ice storage means;

ice lifting means positioned within said ice storage means;

a paddle wheel positioned within said ice lifting means; and rotating means for rotating said ice lifting means to deposit ice in said ice lifting means and to elevate said ice from a lowermost portion of said ice storage means for discharge onto said paddle wheel, wherein said paddle wheel rotates to deliver said ice to said ice discharge means in a consistent flow.

2. The combination ice and beverage dispenser according to claim 1 wherein said ice lifting means comprises a circular rotating tray and a stationary cone chute mounted in the center of said circular rotating tray.

3. The combination ice and beverage dispenser according to claim 2 wherein said paddle wheel is positioned within said stationary cone chute and is rotated by said rotating means.

4. The combination ice and beverage dispenser according to claim 3 wherein said paddle wheel comprises a plurality of vanes which form a plurality of enclosures within said cone chute, wherein each of said plurality of enclosures receives ice form said circular rotating tray through an opening in said cone chute and delivers said ice to said ice discharge means.

5. The combination ice and beverage dispenser according to claim 2 wherein said circular rotating tray comprises a plurality of vanes inside said tray extending axially toward said cone chute, wherein each of said plurality of vanes provides means on said circular rotating tray to elevate said ice to an opening in said cone chute.

6. The combination ice and beverage dispenser according to claim 1 further comprising means for agitating ice forward towards said circular lifting means to deposit ice from said ice storage means into said circular lifting means, wherein said means for agitating ice is rotated by said rotating means.

7. The combination ice and beverage dispenser of claim 6 wherein said ice discharge means comprises a wall chute, a trap door, and an external discharge chute, said trap door being positioned between said wall chute and said external discharge chute

8. The combination ice and beverage dispenser according to claim 7 wherein said means for agitating ice, said rotating means, and said trap door are activated into motion simultaneously by a single activation source.

9. The combination ice and beverage dispenser of claim 8 wherein said rotating means may be activated into motion at time intervals by said single activation source without activation of said trap door.

10. The combination ice and beverage dispenser according to claim 1 wherein said ice storage means comprises a bottom, four side walls substantially and uniformly perpendicular to said bottom, and a removable cover.

11. The combination ice and beverage dispenser according to claim 10 wherein said bottom of said ice storage means supports a cold plate, wherein said cold plate comprises an efficient thermal transfer metal block cast with a plurality of product lines molded therein which cool as said cold plate cools.

12. The combination ice and beverage dispenser according to claim 10 wherein said four side walls of said ice storage means each have cavities filled with foam-insulating means with at least one of said four side walls having a plurality of product lines positioned therein, said plurality of product lines being embedded in said foam-insulating means.

13. The combination ice and beverage dispenser according to claim 1 wherein said rotating means comprises motor means coupled to a rotatable shaft.

* * * * *